April 24, 1962    J. M. SCHWARTZ ET AL    3,030,863
ZOOM TYPE OF VARIABLE MAGNIFICATION OPTICAL SYSTEM
FOR ATTACHMENT TO PHOTOGRAPHIC OBJECTIVES
Filed Dec. 28, 1959    2 Sheets-Sheet 1

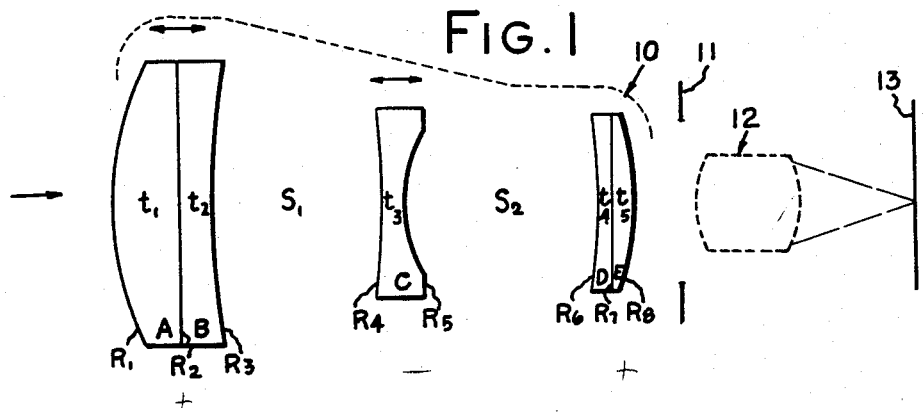

FIG. 1

| LENS | CURVATURES | THICKNESS | SPACINGS | | $n_D$ | $V$ |
|---|---|---|---|---|---|---|
| A | $R_1 = 42.855$ | $t_1 = 6.5$ | $S_1 =$ | AT 0.60x = 1.55 | 1.691 | 54.8 |
|   | $R_2 = \infty$ |   |   | AT 1.0x = 20.92 |   |   |
| B | $R_3 = 139.32$ | $t_2 = 3.5$ |   | AT 1.90x = 34.69 | 1.7506 | 27.8 |
| C | $R_4 = -187.07$ | $t_3 = 2.5$ | $S_2 =$ | AT 0.60x = 39.47 | 1.620 | 60.3 |
|   | $R_5 = 20.137$ |   |   | AT 1.0x = 27.74 |   |   |
| D | $R_6 = -147.23$ | $t_4 = 1.5$ |   | AT 1.90x = 2.10 | 1.7506 | 27.8 |
|   | $R_7 = \infty$ |   |   |   |   |   |
| E | $R_8 = -42.855$ | $t_5 = 2.0$ |   |   | 1.691 | 54.8 |

ZOOM MAGNIFICATION RANGE = 0.60x to 1.90x

FIG. 2

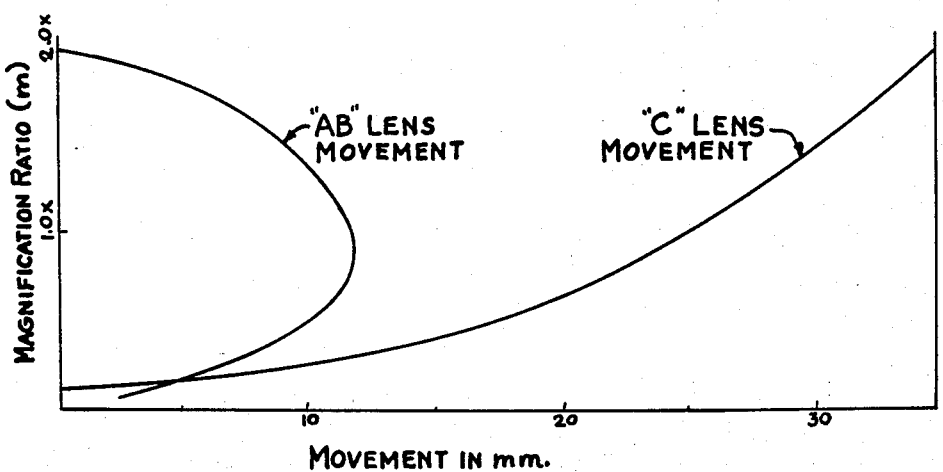

FIG. 3

JOHN M. SCHWARTZ
GEORGE F. ZIEGLER
*INVENTORS*

BY *Frank C. Parker*

*ATTORNEY*

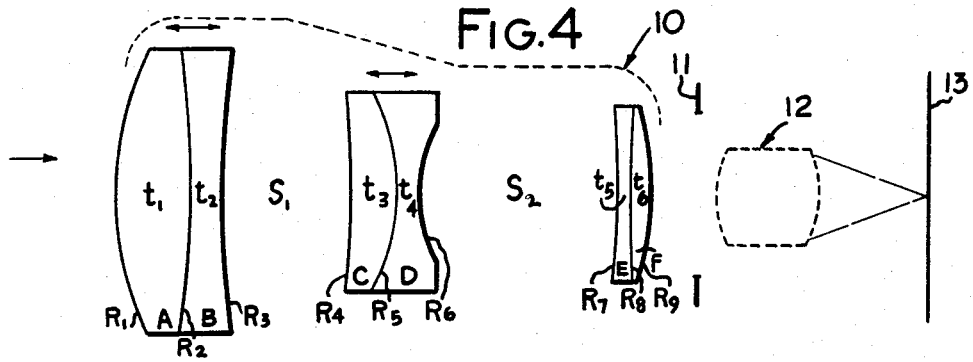

| \multicolumn{6}{l|}{ZOOM MAGNIFICATION RANGE 0.66x to 1.90x} |
| LENS | CURVATURES | THICKNESS | SPACINGS | $n_D$ | $v$ |
|---|---|---|---|---|---|
| A | $R_1 = 44.463$ / $R_2 = -100.0$ | $t_1 = 8.8$ | $S_1$ AT 0.66x = 1.42 | 1.720 | 47.5 |
| B | $R_3 = 129.42$ | $t_2 = 3.6$ | AT 1.0x = 16.32 | 1.720 | 29.3 |
| C | $R_4 = -478.63$ / $R_5 = -25.119$ | $t_3 = 4.8$ | AT 1.9x = 30.02 | 1.720 | 29.3 |
| D | $R_6 = 22.08$ | $t_4 = 2.3$ | $S_2$ AT 0.66x = 37.68 | 1.720 | 47.5 |
| E | $R_7 = -139.32$ / $R_8 = 75.858$ | $t_5 = 1.5$ | AT 1.0x = 27.70 | 1.720 | 29.3 |
| F | $R_9 = -44.463$ | $t_6 = 2.0$ | AT 1.9x = 1.27 | 1.720 | 47.5 |

FIG. 6

| \multicolumn{6}{l|}{ZOOM MAGNIFICATION RANGE 0.67x to 1.87x} |
| LENS | CURVATURES | THICKNESS | SPACINGS | $n_D$ | $v$ |
|---|---|---|---|---|---|
| A | $R_1 = 42.855$ / $R_2 = -131.83$ | $t_1 = 8.8$ | $S_1$ AT 0.67x = 1.35 | 1.691 | 54.8 |
| B | $R_3 = 149.97$ | $t_2 = 3.6$ | AT 1.0x = 15.74 | 1.7506 | 27.8 |
| C | $R_4 = -478.63$ / $R_5 = -30.20$ | $t_3 = 4.8$ | AT 1.87x = 29.33 | 1.7506 | 27.8 |
| D | $R_6 = 20.157$ | $t_4 = 2.4$ | $S_2$ AT 0.67x = 36.93 | 1.691 | 54.8 |
| E | $R_7 = -158.49$ / $R_8 = 180.30$ | $t_5 = 1.5$ | AT 1.0x = 27.17 | 1.7506 | 27.8 |
| F | $R_9 = -42.855$ | $t_6 = 2.0$ | AT 1.87x = 1.45 | 1.691 | 54.8 |

JOHN M. SCHWARTZ
GEORGE F. ZIEGLER
*INVENTORS*

United States Patent Office 3,030,863
Patented Apr. 24, 1962

3,030,863
ZOOM TYPE OF VARIABLE MAGNIFICATION OPTICAL SYSTEM FOR ATTACHMENT TO PHOTOGRAPHIC OBJECTIVES
John M. Schwartz, Irondequoit, and George F. Ziegler, Rochester, N.Y., assignors to Bausch & Lomb Incorporated, a corporation of New York
Filed Dec. 28, 1959, Ser. No. 862,247
5 Claims. (Cl. 88—57)

This invention relates to an afocal variable magnification optical attachment of the zoom type for a photographic objective and the like whereby the objective may be converted quickly from wide angle to telephoto performance in an infinite number of steps.

Optical objectives of the kind here disclosed are classified as being symmetrical in form and mechanically compensated for image shift so that the image remains substantially stationary during changes of magnification.

An object of this invention is to provide a variable magnification optical system of the above-identified kind for use with photographic objectives and the like, said system being particularly well corrected by itself for chromatic aberrations and further being well corrected for spherical abberations, astigmatism, coma, distortion and field curvature.

A further object is to provide such a device which is of simple form and of a construction suitable for economical manufacture and which is capable of superior performance when used with photographic objectives having relative apertures as great as $f/1.8$.

Further objects and advantages will be apparent in the details of construction and arrangement of parts as described in the specification hereafter taken together with the drawings, in which:

FIG. 1 is an optical diagram of one form of variable magnification afocal optical system of the zoom type constructed according to our invention;

FIG. 2 is a table giving the optical constructional data for the optical system shown in FIG. 1;

FIG. 3 is a chart showing the coordinated movement of the two movable parts of the optical system;

FIG. 4 is an optical diagram representing a modification of the optical system shown in FIG. 1;

FIG. 5 is a table of constructional data relating to the optical system shown in FIG. 4; and FIG. 6 is a table of optical constructional data pertaining to a still further form of optical system which is closely related to the system shown in FIG. 4.

Contributing greatly to the attainment of the above-mentioned objects is the advantageous relationship between the powers of the individual lens members of the afocal system as hereinafter described. Furthermore, the optical form of said optical system is symmetrical which is most favorable to the correction of lens aberrations. Of still greater importance in correcting fully the chromatic aberrations of the image is the judicious and calculated proper balance of the equivalent Abbe numbers relating to the individual lens members which are comprised in the optical system. The greater the value of the equivalent Abbe number with respect to each lens member, the better is the correction of chromatic aberrations in the optical system without detracting from the state of correction of the monochromatic image errors. The "equivalent Abbe number" ($\nu_e$) is a calculated number, taking into consideration not only the $\nu$ values of the individual elements of a doublet but also the $n_D$ values and powers thereof. The "equivalent Abbe number" calculation is suggested, for instance, by F. D. Cruickshank of the Department of Physics in the University of Tasmania in his short treatise entitled "The Design of Photographic Objectives of the Triplet Family," as reported in The Australian Journal of Physics, vol. II, No. 1, March 1958, pages 42–43. Throughout the entire zooming range of the optical system, an excellent state of correction for chromatic and spherical image aberrations, astigmatism, coma, distortion and field curvature is maintained when used with objectives having a relative aperture as great as $f/1.8$.

The present invention is here disclosed in three specific forms as a camera lens attachment, generally indicated by the numeral 10, but it is not limited to photographic optics in its use. One form thereof is shown in FIG. 1 wherein the front lens AB is constructed in meniscus form of two pieces of optical glass, the front part being a plano-convex lens A and the rear part being a plano-concave lens B which is preferably cemented to lens A. This lens has positive power and is convex toward the entrant light or object side thereof. Spaced rearwardly from the front lens AB is a double concave lens C which is optically aligned therewith and has negative power, the strongest curvature on this lens being on the rear or image side of the optical system. Spaced rearwardly from the negative lens C is a rear doublet lens DE which is constructed in meniscus form from two lens parts D and E and is convex toward the rear, the D lens being a plano-concave element and the E lens being a plano-convex element and preferably cemented to the D element. Doublet lens DE has positive power and this lens is spaced a fixed distance of about 10 percent of the overall length of the optical system in front of a diaphragm 11 which is a part of the camera objective 12 which is indicated by dotted lines. The entire assembly of lenses AB, C, DE is completely corrected as a separate unitary optical system for chromatic and spherical aberrations, astigmatism, coma, distortion and field curvature so that this lens system may be used equally well with various photographic objectives 12. This optical system 10 is nominally symmetrical in form, that is, the meniscus lenses AB and DE are each concave toward the interpositioned negative lens C and said meniscus lenses are substantially similar in construction. The image is formed at 13 by the variable magnification optical system 10 acting together with the objective 12.

Lens AB and lens C are individually movably mounted for differential motion with respect to the stationary rear lens EF so that the optical system is mechanically compensated by mechanical means, not shown, to maintain the image 13 substantially stationary throughout all changes of magnification between substantially $0.5\times$ and $2.0\times$. The motion of lenses AB and C is graphically shown by the two curves shown in FIG. 3. The individual magnifications at which the lens members AB, C, and DE work when located in such a position that said system produces unity magnification being substantially, $+2.1\times$ to $+2.2\times$ for the front positive lens AB,
$+0.4\times$ to $+0.5\times$ for the negative lens C, and
$+1.0\times$ to $+1.1\times$ for the rear positive lens DE.

Since the front and rear positive lenses AB and DE are symmetrical in form and similar in construction, the individual positive powers thereof are substantially equal, the specific focal length of the front lens AB in FIG. 1 being substantially 88.95 and the corresponding focal length of the rear lens DE being substantially 89.34.

According to the invention, the relationship of the power of the negative lens C to the front positive lens AB is very important in obtaining the satisfactory zooming qualities of this lens system and to that end the ratio between the power of the front lens AB is numerically substantially three times the power of the negative lens. Furthermore, the numerical sum of the radii of curvature of the convex outer surfaces $R_1$ and $R_8$ (FIG. 1), or $R_1$ and $R_9$ (FIGS. 4 and 5), of the aforesaid positive lenses being about .3 times the numerical sum of the radii of curvature of the outer concave surfaces $R_3$ and $R_6$ (FIG. 1), or $R_3$ and $R_7$ (FIGS. 4 and 5) thereof. The constructional properties of the lens system 10 are so chosen and the parts are so arranged that when the system is producing unity magnification, lens AB works at a magnification of +2.11, lens C works at a magnification of +0.448 and lens DE works at a magnification of +1.058.

It is very essential to the proper correction of chromatic and other aberrations in the lens system that the balance of equivalent Abbe numbers relating to the individual lenses AB, C, DE is properly chosen. In this regard, the greater the value of the equivalent Abbe number of any individual lens member, the better the corrections of chromatic aberrations in this lens, in addition to promoting good corrections for all monochromatic image errors. As mentioned heretofore, the equivalent Abbe number is a calculated number, taking into account the Abbe number of every element of a lens and also the powers of the lens elements and refractive index of the materials from which the lens is made. To elucidate the term "equivalent Abbe number," a sample calculation with respect to the EF positive lens, found in the third form of this invention (FIG. 6), is given herebelow.

The radii of curvature found in the EF lens member are $R_9=42.855$, $R_8=-180.30$, $R_7=158.49$ and thicknesses are not important since this calculation is for thin lenses. The refractive index of the F element and of the E element is 1.691 and 1.7506, respectively, and the $\nu$ values of these same elements is respectively 54.8 and 27.8.

$N_F(X) - N_C(X) = \Delta N(X)$ for any lens element X, wherein $N_F(X)$ and $N_C(X)$ are respectively the index of refraction of lens element X for the blue and the red lines of the spectrum respectively and wherein, whenever X represents the F lens element, $\Delta N = .01261$ and likewise whenever X represents the E lens element, $\Delta N = .02702$ $$\frac{1}{R} = \frac{1}{R_9} - \frac{1}{R_7}$$

or $C = C_9 - C_7 = .017025$ where "C" denotes lens curvature.

$C_a = C_9 - C_8 = .0288808$ $$K = -\frac{C_a}{C} = -1.696376$$

$N_e = N_{(E)} + K(N_{(E)} - N_{(F)})$ (Equivalent refractive index)
$N_e = 1.7506 + (-1.69637)(.0596)$
$N_e = 1.64949$ $$\nu e = \frac{N_e - 1}{\Delta N_{(E)} + K(\Delta N_{(E)} - \Delta N_{(F)})}$$
$$= \frac{.649496}{(.02702) + (-1.696376)(.01441)}$$

$\nu e = \frac{.649496}{.0025752} = 252.21$ (Equivalent Abbe number)

In the form of the lens system shown in FIG. 1, for instance, the equivalent Abbe number for the AB lens is 100 and the equivalent Abbe numbers for the negative lens C and the positive lens DE are, respectively, 60 and 100. It will be observed by referring to the aforesaid equivalent Abbe numbers that the ratio between these equivalent Abbe numbers is about 1.666. This ratio is considered to be well within the recommended lower limit of such a ratio which is about 1.5.

The lens construction shown in FIG. 1 is of particular value as an economical construction. Since the A and B elements of the front positive lens both include a plano surface and the remaining refractive surfaces are of low curvature, they are easy and cheap to produce. Likewise, the rear positive lens DE also is composed of two elements D and E which each have a plano surface and a surface of low curvature for the sake of economy.

There is given herebelow a chart listing the specific constructional data of the form of optical system shown in FIG. 1. Herein, $R_1$ to $R_8$ designate the curvatures of the refractive surfaces, $t_1$ to $t_5$ designate the axial thicknesses of the lens elements, $S_1$ and $S_2$ designate the variable spaces between the lens members, and $n_D$ and $\nu$ represent the refractive index and Abbe number, respectively, of said elements, taken in order from the front.

[Zoom Magnification Range 0.60× to 1.90×]

| Lens | Curvatures | Thickness | Spaces | $n_D$ | $\nu$ |
|---|---|---|---|---|---|
| A | $R_1=42.855$ | $t_1=6.5$ | | 1.691 | 54.8 |
|   | $R_2=$Plano | | | | |
| B | $R_3=139.32$ | $t_2=3.5$ | | 1.751 | 27.8 |
|   | | | $S_1\begin{cases}\text{at }0.6\times=1.55\\\text{at }1.0\times=20.92\\\text{at }1.9\times=34.69\end{cases}$ | | |
|   | $R_4=-187.07$ | | | | |
| C | $R_5=20.137$ | $t_3=2.5$ | | 1.620 | 60.3 |
|   | | | $S_2\begin{cases}\text{at }0.6\times=39.47\\\text{at }1.0\times=27.74\\\text{at }1.9\times=2.10\end{cases}$ | | |
|   | $R_6=-147.23$ | | | | |
| D | $R_7=$Plano | $t_4=1.5$ | | 1.751 | 27.8 |
| E | $R_8=-42.855$ | $t_5=2.0$ | | 1.691 | 54.8 |

With reference to FIG. 4 of the drawing, there is illustrated an optical system similar to the one above-described and shown in FIG. 1 having an improved correction for color and other image aberrations. In this form of the invention the movable front positive lens AB is constructed in doublet form comprising a double-convex element A which is preferably cemented to a double-concave element B to form a meniscus-shaped lens. The movable negative lens in this case is composed of two elements C and D, the C element being in meniscus form and the rear element D being of double-concave form, the stronger curvature being toward the rear of the optical system. Spaced rearwardly from the negative lens CD is a stationary rear positive lens EF which is composed of the double-concave element E which is preferably cemented to the double-convex element F to form a meniscus lens of positive power similar to lens AB. These lenses AB, CD, EF are completely corrected as a complete optical system for substantially all chromatic and monochromatic errors in the image which is formed at the focal plane 13 so that the entire system may be applied to any photographic objective 12 without altering any of the performance characteristics of said objective.

In this form of the invention the focal length of the lens member AB is chosen as 88.904 and the focal length of the negative lens member CD has a numerical value of 29.158 whereby the minimum advantageous ratio of powers or focal lengths of at least 1.5 is obtained. Symmetry of the system is effectively maintained by making the focal length of the rear positive lens 89.321 which gives it substantially the same power as the front lens. To provide the zooming action required, the front lens AB and the negative lens CD are both movable in such a manner as shown in FIG. 3 that the image formed by the optical system remains stationary at the focal plane 13 while the size of the image produced is varied in size.

According to this form of the invention, the improved state of chromatic correction of the image produced by this optical system is due to the fact that the equivalent Abbe number of each of the lens members is considerably higher than in the first form of the invention shown in FIG. 1. For instance, the equivalent Abbe number of the AB lens member is 177.0, the equivalent Abbe number of the CD lens member is 104.0 and the equivalent Abbe number of the rear lens member EF is 272.0. It will be noted that the minimum advantageous ratio of at least 1.5 between the powers of the lens members AB and CD is considerably exceeded here since the ratio is about 3.0.

Given herebelow is a table of constructional data for the above-described lens system, wherein $R_1$ to $R_9$ represent the refractive curvatures of the lens surfaces, $t_1$ to $t_6$ represent the axial thicknesses of the lens elements A, B, C, D, E, F, respectively, $S_1$ and $S_2$ represent the variable spaces between the respective lens members AB, CD and EF, $n_D$ represents the refractive index and $\nu$ represents the reciprocal relative dispersion or Abbe number of the glass used in constructing the lens elements.

[Zoom Magnification Range 0.66× to 1.90×]

| Lens | Curvatures | Thickness | Spaces | $n_D$ | $\nu$ |
|---|---|---|---|---|---|
| A | $R_1$= 44.463 | $t_1$=8.8 | | 1.720 | 47.5 |
| | $R_2$=−100.0 | | | | |
| B | | $t_2$=3.6 | | 1.720 | 29.3 |
| | $R_3$= 129.42 | | $S_1$ {at 0.66×=1.42<br>at 1.0×=16.32<br>at 1.9×=30.02} | | |
| | $R_4$=−478.63 | | | | |
| C | | $t_3$=4.3 | | 1.720 | 29.3 |
| | $R_5$=−25.119 | | | | |
| | | $t_4$=2.3 | | 1.720 | 47.5 |
| | $R_6$=22.08 | | | | |
| D | | | $S_2$ {at 0.66×=37.68<br>at 1.0×=27.7<br>at 1.9×=1.27} | | |
| | $R_7$=−139.32 | | | | |
| E | | $t_5$=1.5 | | 1.720 | 29.3 |
| | $R_8$= 75.858 | | | | |
| F | | $t_6$=2.0 | | 1.720 | 47.5 |
| | $R_9$=−44.463 | | | | |

All Dimensions in mm.

A third form of the invention is described herebelow, wherein the color aberrations as well as the monochromatic aberrations are all exceedingly well corrected. In this form of the invention, which is similar to FIG. 4 of the drawing, the identification of the lenses is the same as shown in FIG. 4, and the constructional data therefor is given in the table herebelow and also in FIG. 6 of the drawings.

[Zoom Magnification Range 0.60× to 1.87×]

| Lens | Curvatures | Thickness | Spaces | $n_D$ | $\nu$ |
|---|---|---|---|---|---|
| A | $R_1$=42.855 | $t_1$=8.8 | | 1.691 | 54.8 |
| | $R_2$=−131.83 | | | | |
| B | | $t_2$=3.6 | | 1.7506 | 27.8 |
| | $R_3$=149.97 | | $S_1$ {at 0.67×=1.35<br>at 1.0×=15.74<br>at 1.87×=29.33} | | |
| | $R_4$=−478.63 | | | | |
| C | | $t_3$=4.8 | | 1.7506 | 27.8 |
| | $R_5$=−30.2 | | | | |
| D | | $t_4$=2.4 | | 1.691 | 54.8 |
| | $R_6$=20.137 | | | | |
| | | | $S_2$ {at 0.67×=36.93<br>at 1.0×=27.17<br>at 1.87×=1.45} | | |
| | $R_7$=−158.49 | | | | |
| E | | $t_5$=1.5 | | 1.7506 | 27.8 |
| | $R_8$=180.3 | | | | |
| F | | $t_6$=2.0 | | 1.691 | 54.8 |
| | $R_9$=−42.855 | | | | |

In the above table, $R_1$ to $R_9$ represent the refractive curvature of the lens surfaces, $t_1$ to $t_6$ represent the axial thicknesses of the lens elements A, B, C, D, E, F respectively, $S_1$ and $S_2$ represent the variable spaces between the respective lens members AB, CD, EF, $n_D$ represents the refractive index and $\nu$ represents the reciprocal relative dispersions or Abbe numbers of the glasses from which the lens elements are constructed.

In this form of the invention, the specific values of focal lengths for the front lens AB and the negative lens CD are respectively 88.6 and 29.386 which gives a very favorable ratio of about 3.0 for zooming purposes. The corresponding focal length for the rear positive lens is 89.139 which shows that the power of the front and rear positive lenses is substantially the same while the ratio of focal lengths between the front positive and the negative lens is considerably greater than the minimum recommended ratio of 1.5.

With regard to the third form of the invention, the values for the "equivalent Abbe number" are the most favorable of all of the forms disclosed since the equivalent Abbe number of the lens AB is 2238.0, the corresponding values for the negative lens CD and the rear positive lens EF being respectively 172.0 and 347.0 which yields a substantially complete correction for chromatic aberrations at all specified magnifications of the image when used with objectives 12 having relative apertures as great as $f/1.8$.

To sum up the advantages of the various forms of this invention, it is pointed out that the first form of the invention is especially economical to build since it includes plano-surfaced lenses and refractive surfaces of low curvature which are cheap and easy to build. The second form of the invention shown in FIG. 4 represents an effort to improve the state of correction of chromatic aberrations and still retain economical manufacturing qualities by means of building all the lens elements of glass having the same refractive index. The color corrections, nevertheless, are improved by computing an advantageous equivalent Abbe number for each lens so that a good state of general correction of image errors is achieved without greatly raising the cost of the lens. In the third form of the invention, the lens system is corrected for all of the aforesaid image aberrations, particularly the chromatic aberrations, in the best manner possible consistent with economical practices in this form of optical system.

With respect to the second and third forms of this invention wherein a compound negative lens CD is used, the constructional data therefor may further be specified by the following numerical statement of inequalities, $$0.44 \, F_{AB} < R_1 < 0.53 \, F_{AB}$$
$$1.10 \, F_{AB} < -R_2 < 1.60 \, F_{AB}$$
$$1.41 \, F_{AB} < R_3 < 1.72 \, F_{AB}$$
$$4.84 \, F_{AB} < -R_4 < 6.92 \, F_{AB}$$
$$2.12 \, F_{AB} < R_6 < 2.65 \, F_{AB}$$
$$1.51 \, F_{AB} < -R_7 < 1.84 \, F_{AB}$$
$$0.80 \, F_{AB} < R_8 < 2.2 \, F_{AB}$$
$$0.44 \, F_{AB} < -R_9 < 0.53 \, F_{AB}$$
$$0.09 \, F_{AB} < t_1 < 0.11 \, F_{AB}$$
$$.036 \, F_{AB} < t_2 < .045 \, F_{AB}$$
$$0.73 \, F_{AB} < (t_3 + t_4) < 0.90 \, F_{AB}$$
$$.015 \, F_{AB} < t_5 < .019 \, F_{AB}$$
$$.02 \, F_{AB} < t_6 < .03 \, F_{AB}$$

$0.17 F_{AB} < S_1 < 0.20 F_{AB}$
$1.69 S_1 < S_2 < 1.73 S_1$ } when optical system produces unity magnification wherein $R_1$ to $R_9$ designate the radius of curvature of the refractive surfaces of the respective lens elements A, B, C, D, E and F, $t_1$ to $t_6$ designates the axial thickness of the aforesaid elements, $S_1$ and $S_2$ represent the variable spaces between the lens members AB, CD, and EF respectively and $F_{AB}$ represents the focal length of the lens member AB per se.

Although but several forms of this invention have been shown and described in detail, it will be understood that the dimensional properties and choice of materials in this optical system may be changed and altered considerably without departing from the spirit of the invention as defined in the claims appended hereto.

We claim:

1. An afocal zoom type of mechanically compensated optical system of symmetrical form for attachment to a photographic objective having a relative aperture of at least $f/1.8$ for varying continuously the size of a stationary image which is formed by said system and objective through a range of magnifications of substantially 0.50× to 2.0×, said system being substantially fully corrected per se for chromatic and spherical aberrations, astigmatism, coma, distortion and field curvature for all magnifications within said range, said system comprising a movable front meniscus compound lens of positive power, a stationary meniscus compound lens of positive power located rearwardly thereof, the concave sides of said positive lenses facing each other, and a movable compound negative lens located in optical alignment between said positive lenses, said movable positive and negative lenses being differentially movable relative to the stationary lens differentially so that said image remains substantially stationary for all magnifications in said range, the individual power of either positive lens being numerically three times the power of the negative lens and the equivalent Abbe number of the positive lenses being at least 1.5 times the equivalent Abbe number of the negative lens, the constructional data being specified by the limiting values given herebelow, $$0.44\ F_{AB} < R_1 < 0.53\ F_{AB}$$
$$1.10\ F_{AB} < -R_2 < 1.60\ F_{AB}$$
$$1.41\ F_{AB} < R_3 < 1.72\ F_{AB}$$
$$4.84\ F_{AB} < -R_4 < 6.92\ F_{AB}$$
$$2.12\ F_{AB} < R_6 < 2.65\ F_{AB}$$
$$1.51\ F_{AB} < -R_7 < 1.84\ F_{AB}$$
$$0.80\ F_{AB} < R_8 < 2.2\ F_{AB}$$
$$0.44\ F_{AB} < -R_9 < 0.53\ F_{AB}$$
$$0.09\ F_{AB} < t_1 < 0.11\ F_{AB}$$
$$.036\ F_{AB} < t_2 < .045\ F_{AB}$$
$$0.73\ F_{AB} < (t_3 + t_4) < 0.90\ F_{AB}$$
$$.015\ F_{AB} < t_5 < .019\ F_{AB}$$
$$.02\ F_{AB} < t_6 < .03\ F_{AB}$$

$$\left. \begin{array}{l} 0.17 F_{AB} < S_1 < 0.20 F_{AB} \\ 1.69 S_1 < S_2 < 1.73 S_1 \end{array} \right\} \text{when optical system produces unity magnification}$$

wherein $R_1$ to $R_9$ designates the radius of curvature of the refractive surfaces, $t_1$ to $t_6$ designate the axial thicknesses of the lens elements, and $S_1$ and $S_2$ represent the variable spaces between the respective lens members, and $F_{AB}$ is the focal length of the AB lens per se.

2. An afocal mechanically compensated zoom type of optical system for attachment to a photographic objective for varying continuously the size of a stationary image which is formed thereby through a range of magnifications between 0.5× and 2.0×, said system being substantially fully corrected per se for chromatic and spherical aberrations, astigmatism, coma, distortion and field curvature for all said magnifications, said system comprising a movable front meniscus doublet lens having positive power, a stationary rear meniscus doublet lens having positive power, said positive lenses having their concave sides facing each other, and a movable double concave single lens having negative power and optically aligned between said positive lenses, the front positive lens and said negative lens being movable relative to each other and relative to said stationary rear lens in such a differential manner as to effect a continuous variation in the magnification of said image while the image remains substantially stationary, the front and rear lens each consisting of a plano-convex lens element and a plano-concave element in substantial contact therewith along their plano surfaces, the outer surfaces of the positive lenses having a radius of curvature between .25 and .33 times the radius of curvature of the inner exposed surfaces thereof, the difference of refractive index values between the respective elements being not less than .055, the greater index relating to the innermost of said elements, the equivalent Abbe number of each of said positive lenses being at least 1.5 times the equivalent Abbe number of the negative lens, the individual magnifications at which the respective lenses are working while said system produces unity magnification being substantially +2.1× to +2.2× for the front positive lens,
+0.4× to +0.5× for the negative lens, and
+1.0× to +1.1× for the rear positive lens, and the variable air spaces $S_1$ and $S_2$ between said lenses simultaneously being as specified herebelow, $$0.17\ F_{AB} < S_1 < 0.20\ F_{AB}$$
$$1.69\ S_1 < S_2 < 1.73\ S_1$$

wherein $F_{AB}$ is the individual focal length of said front positive lens AB.

3. An afocal mechanically compensated zoom type of variable magnification optical system for attachment to photographic objectives for varying the size of the image which is formed in a stationary plane and capable of operating at all focal lengths between the wide angle and telephoto conditions, said attachment comprising a front doublet positive lens, a stationary rear doublet positive lens, and a negative lens optically aligned therebetween, said positive lenses being in meniscus form and having their concave sides facing each other, said front positive lens and said negative lens being movable differentially relative to said rear lens to vary the magnification of said image continuously through a range of magnifications while maintaining said image substantially stationary, the lenses thereof being formed according to the constructural data given in the table herebelow wherein $R_1$ to $R_8$ designate the refractive curvatures thereof numbering from front to rear, $t_1$ to $t_5$ designate the thicknesses of the respective lens elements A, B, C, D and E, $S_1$ and $S_2$ designate the variable spaces between the lens components thereof, $n_D$ represents the refractive index and $\nu$ represents the reciprocal relative dispersion or Abbe number respectively of the optical materials from which said elements are made, all dimensions being stated in millimeters.

[Zoom Magnification Range 0.60× to 1.90×]

| Lens | Curvatures | Thickness | Spaces | $n_D$ | $\nu$ |
|---|---|---|---|---|---|
| A | $R_1 = 42.855$ | $t_1 = 6.5$ | | 1.691 | 54.8 |
| B | $R_2 =$ Plano | $t_2 = 3.5$ | | 1.751 | 27.8 |
|   | $R_3 = 139.32$ | | $S_1 \begin{cases} \text{at } 0.6\times = 1.55 \\ \text{at } 1.0\times = 20.92 \\ \text{at } 1.9\times = 34.69 \end{cases}$ | | |
| C | $R_4 = -187.07$ | $t_3 = 2.5$ | | 1.620 | 60.3 |
|   | $R_5 = 20.137$ | | $S_2 \begin{cases} \text{at } 0.6\times = 39.47 \\ \text{at } 1.0\times = 27.74 \\ \text{at } 1.9\times = 2.10 \end{cases}$ | | |
| D | $R_6 = -147.23$ | $t_4 = 1.5$ | | 1.751 | 27.8 |
| E | $R_7 =$ Plano | $t_5 = 2.0$ | | 1.691 | 54.8 |
|   | $R_8 = -42.855$ | | | | |

4. An afocal mechanically compensated zoom type of variable magnification optical system for attachment to photographic objectives for varying the size of the image which is formed at a stationary plane so as to provide all focal lengths between a wide angle or a telephoto condition, said attachment comprising a front doublet positive lens, a stationary rear doublet positive lens, said positive lenses being in meniscus form having their concave sides facing each other, and a negative lens optically aligned therebetween, said front positive lens and said negative lens being movable differentially relative to said rear lens to effect the variation of said size while maintaining said image substantially stationary, the lenses thereof being formed according to the constructional data given in the table herebelow wherein $R_1$ to $R_9$ designate the refractive curvatures of the lens surfaces numbering from the front to the rear, $t_1$ to $t_6$ designate the axial thicknesses of the respective lens elements A, B, C, D, E and F, $S_1$ and $S_2$ designate the variable spaces between the successive lens members, $n_D$ represents the refractive index, and $\nu$ represents the reciprocal relative dispersion or Abbe number respectively of the optical materials from which said elements are made, all dimensions being stated in millimeters,

[Zoom Magnification Range 0.66× to 1.90×]

| Lens | Curvatures | Thickness | Spaces | $n_D$ | $\nu$ |
|---|---|---|---|---|---|
| A | $R_1=44.463$<br>$R_2=-100.0$ | $t_1=8.8$ | | 1.720 | 47.5 |
| B | $R_3=129.42$ | $t_2=3.6$ | | 1.720 | 29.3 |
| | | | $S_1\begin{cases}\text{at } 0.66×=1.42\\ \text{at } 1.00×=16.32\\ \text{at } 1.90×=30.02\end{cases}$ | | |
| C | $R_4=-478.63$<br>$R_5=-25.119$ | $t_3=4.8$ | | 1.720 | 29.3 |
| D | $R_6=22.08$ | $t_4=2.3$ | | 1.720 | 47.5 |
| | | | $S_2\begin{cases}\text{at } 0.66×=37.68\\ \text{at } 1.00×=27.70\\ \text{at } 1.90×=1.27\end{cases}$ | | |
| E | $R_7=-139.32$<br>$R_8=75.858$ | $t_5=1.5$ | | 1.720 | 29.3 |
| F | $R_9=-44.463$ | $t_6=2.0$ | | 1.720 | 47.5 |

5. An afocal mechanically compensated variable power optical system of zoom type for attachment to a photographic objective for continuously and progressively varying the size of the image formed thereby at a stationary image plane, said attachment comprising a front positive doublet lens, a stationary rear positive doublet lens, said positive lenses being in meniscus form and having their concave sides facing each other, and a negative lens optically aligned therebetween, said front positive lens and said negative lens being movable differentially relative to said rear lens to effect the variation of said size while maintaining the image position substantially stationary, the lenses thereof being formed according to the constructional data given in the table herebelow wherein $R_1$ to $R_9$ designate the refractive curvatures of the lens surfaces numbering from the front to the rear, $t_1$ to $t_6$ designate the axial thicknesses of the various lens elements A, B, C, D, E and F, $S_1$ and $S_2$ designate the variable spaces between the successive lens components, $n_D$ represents the refractive index and $\nu$ represents the reciprocal relative dispersion or Abbe number respectively of the optical materials from which said elements are made, all dimensions being stated in millimeters,

[Zoom Magnification Range 0.67× to 1.87×]

| Lens | Curvatures | Thickness | Spaces | $n_D$ | $\nu$ |
|---|---|---|---|---|---|
| A | $R_1=42.855$<br>$R_2=-131.83$ | $t_1=8.8$ | | 1.691 | 54.8 |
| B | $R_3=149.97$ | $t_2=3.6$ | | 1.751 | 27.8 |
| | | | $S_1\begin{cases}\text{at } 0.67×=1.35\\ \text{at } 1.0×=15.74\\ \text{at } 1.87×=29.33\end{cases}$ | | |
| C | $R_4=-478.63$<br>$R_5=-30.2$ | $t_3=4.8$ | | 1.751 | 27.8 |
| D | $R_6=20.137$ | $t_4=2.4$ | | 1.691 | 54.8 |
| | | | $S_2\begin{cases}\text{at } 0.67×=36.93\\ \text{at } 1.0×=27.17\\ \text{at } 1.87×=1.45\end{cases}$ | | |
| E | $R_7=-158.49$<br>$R_8=180.3$ | $t_5=1.5$ | | 1.751 | 27.8 |
| F | $R_9=-42.855$ | $t_6=2.0$ | | 1.691 | 54.8 |

All Dimensions in mm.

References Cited in the file of this patent

UNITED STATES PATENTS

| | | |
|---|---|---|
| 2,165,341 | Capstaff et al. | July 11, 1939 |
| 2,279,372 | Herzberger | Apr. 14, 1942 |
| 2,645,154 | Tronnier | July 14, 1953 |
| 2,764,062 | Lange | Sept. 25, 1956 |
| 2,818,777 | Hudson et al. | Jan. 7, 1958 |
| 2,898,808 | Baur et al. | Aug. 11, 1959 |
| 2,925,010 | Turula et al. | Feb. 16, 1960 |